(12) United States Patent
Sakoh

(10) Patent No.: US 12,227,616 B2
(45) Date of Patent: Feb. 18, 2025

(54) FLUOROPOLYETHER GROUP-CONTAINING POLYMER AND PRODUCTION METHOD THEREFOR

(71) Applicant: SHIN-ETSU CHEMICAL CO., LTD., Tokyo (JP)

(72) Inventor: Ryusuke Sakoh, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 705 days.

(21) Appl. No.: 17/616,299

(22) PCT Filed: May 26, 2020

(86) PCT No.: PCT/JP2020/020636
§ 371 (c)(1),
(2) Date: Dec. 3, 2021

(87) PCT Pub. No.: WO2020/246301
PCT Pub. Date: Dec. 10, 2020

(65) Prior Publication Data
US 2022/0306803 A1  Sep. 29, 2022

(30) Foreign Application Priority Data

Jun. 6, 2019 (JP) ................. 2019-105865

(51) Int. Cl.
| | |
|---|---|
| C08G 65/337 | (2006.01) |
| C08G 65/00 | (2006.01) |
| C08G 65/22 | (2006.01) |
| C08G 65/323 | (2006.01) |

(52) U.S. Cl.
CPC ......... C08G 65/337 (2013.01); C08G 65/007 (2013.01); C08G 65/226 (2013.01); C08G 65/3236 (2013.01)

(58) Field of Classification Search
CPC .. C08G 65/337; C08G 65/007; C08G 65/226; C08G 65/3236
See application file for complete search history.

(56) References Cited

U.S. PATENT DOCUMENTS

2015/0274889 A1  10/2015  Sakoh et al.
2020/0165384 A1   5/2020  Hoshino et al.

FOREIGN PATENT DOCUMENTS

| JP | 6451279 B2 | 1/2019 |
| JP | 2019-44158 A | 3/2019 |
| WO | WO 2019/039226 A1 | 2/2019 |
| WO | WO 2019/049753 A1 | 3/2019 |
| WO | WO 2020/111009 A1 | 6/2020 |

OTHER PUBLICATIONS

International Search Report (PCT/ISA/210) issued in PCT/JP2020/020636 mailed on Aug. 11, 2020.
Written Opinion (PCT/ISA/237) issued in PCT/JP2020/020636 mailed on Aug. 11, 2020.

*Primary Examiner* — Catherine S Branch
(74) *Attorney, Agent, or Firm* — Birch, Stewart, Kolasch & Birch, LLP

(57) ABSTRACT

The present invention is capable of producing a fluoropolyether group-containing polymer, which is represented by general formula (1)

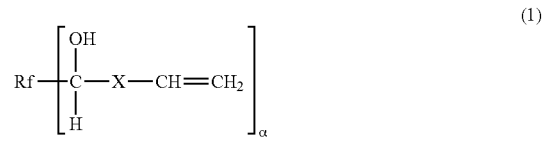

(in the formula, Rf is a monovalent or divalent fluoropolyether group-containing polymer residue, X is independently a divalent organic group, and α is 1 or 2), preferably has a number-average molecular weight of 1,000 to 50,000 in terms of polystyrene, and has both a terminal olefin moiety easily converting a functional group and a secondary hydroxyl group having high reactivity, by causing an organometallic reagent having β-hydrogen, specifically, an organometallic reagent having an aliphatic unsaturated double bond (olefin moiety) at a terminal thereof and having β-hydrogen, to act on a fluoropolyether group-containing polymer having a carbonyl group at a terminal thereof.

8 Claims, No Drawings

FLUOROPOLYETHER GROUP-CONTAINING POLYMER AND PRODUCTION METHOD THEREFOR

TECHNICAL FIELD

The present invention relates to a fluoropolyether group-containing polymer (a compound having on the molecule a monovalent or divalent fluorooxyalkylene group-containing polymer residue). More particularly, the invention relates to a fluoropolyether group-containing polymer that forms a film having excellent water and oil repellency and abrasion resistance, and to a method for producing such a polymer.

BACKGROUND ART

Touch panel technology is rapidly being adopted today in cell-phone displays and other screens for electronic devices. However, a problem with touch panels is that the screen is in an exposed state, creating numerous opportunities for direct contact with the fingers, cheeks, etc. and readily allowing contaminants such as skin oils to adhere. To improve appearance and visibility, there has been a growing need for ways in which to make it harder for users to leave fingerprints on the surface of a display and easier to remove smudges, leading to a desire for materials that can address such demands. In particular, because fingerprints readily form on touch panel displays, it is desired that a water/oil repellent coat be provided on the display. Unfortunately, conventional water/oil repellent coats have a high water and oil repellency and excellent contaminant wipeability, but the anti-smudging performance falls off during use.

Fluoropolyether group-containing compounds have a very low surface free energy and thus generally possess such attributes as water and oil repellency, chemical resistance, lubricity, parting properties and anti-smudging properties. These qualities are widely used industrially in, for example, water/oil-repellent stain-proofing agents for paper and textiles, lubricants for magnetic recording media, oil-proofing agents for precision machinery, parting agents, cosmetics and protective coats. However, these same qualities also manifest as non-tackiness and non-adherence to other substrate materials. Therefore, even when such compounds can be applied to the surface of a substrate, making the resulting coat adhere to the substrate has been a challenge.

Of related interest here are silane coupling agents, which are familiar as substances that bond together substrate surfaces such as glass or fabric with organic compounds and are widely used as coatings for various types of substrate surfaces. Silane coupling agents have an organic functional group and a reactive silyl group (generally a hydrolyzable silyl group such as an alkoxysilyl group) on the same molecule. The hydrolyzable silyl group gives rise to a self-condensing reaction due in part to moisture in the air, forming a film. The hydrolyzable silyl groups in this film bond chemically and physically with the surface of the glass, metal or the like, resulting in a strong and durable coat.

Patent Document 1 (JP No. 6451279) discloses a composition which, by making use of a fluoropolyether group-containing polymer obtained by introducing a hydrolyzable silyl group onto a fluoropolyether group-containing compound, is able to form a coat that readily adheres to a substrate surface and imparts the surface of the substrate with water and oil repellency, chemical resistance, lubricity, parting properties and anti-smudging properties.

In Patent Document 1, a tertiary alcohol of the formula:

[Chem. 1]

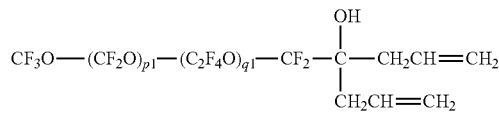

is used as a fluoropolyether group-containing polymer intermediate. Although this intermediate is a polymer having reactive olefin moieties and a hydroxyl group, because the hydroxyl group is tertiary, it has a poor reactivity, making effective use of the hydroxyl group impossible.

PRIOR ART DOCUMENTS

Patent Documents

Patent Document 1: JP No. 6451279

SUMMARY OF INVENTION

Technical Problem

It is therefore an object of the present invention to provide a fluoropolyether group-containing polymer having both a terminal olefin moiety (—CH=CH$_2$) that is easily converted to various functional groups and a secondary hydroxyl group (a hydroxyl group bonded to a secondary carbon atom) of high reactivity. Another object is to provide a method for preparing such a polymer.

Solution to Problem

The inventor has conducted intensive investigations in order to achieve these objects. As a result, he has found that by inducing an organometallic reagent having a β-hydrogen, more specifically an organometallic reagent having on the end an aliphatic unsaturated double bond (a terminal olefin moiety or external olefin moiety) and having a β-hydrogen, to act on a fluoropolyether group-containing polymer having a carbonyl group on the end, there can be obtained a fluoropolyether group-containing polymer of the general formula (1) below:

[Chem. 2]

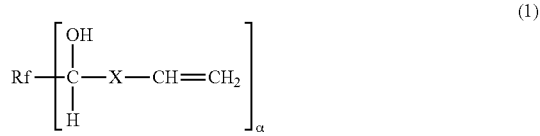

wherein Rf is a monovalent or divalent fluoropolyether group-containing polymer residue, each X is independently a divalent organic group, and α is 1 or 2, which preferably has a number-average molecular weight of from 1,000 to 50,000 in terms of polystyrene and has both an olefin moiety that can be easily converted to a functional group and also a secondary hydroxyl group of high reactivity. This discovery ultimately led to the present invention.

Accordingly, the present invention provides the following fluoropolyether group-containing polymer (a compound having on the molecule a monovalent or divalent fluorooxyalkylene group-containing polymer residue) and a method for preparing such a polymer.

[1]
A fluoropolyether group-containing polymer of the general formula (1) below:

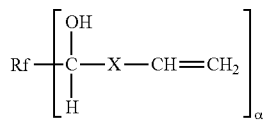 (1)

wherein Rf is a monovalent or divalent fluoropolyether group-containing polymer residue, each X is independently a divalent organic group, and α is 1 or 2.

[2]
The fluoropolyether group-containing polymer of [1], wherein α in the formula (1) is 1 and Rf is a group of the general formula (2) below:

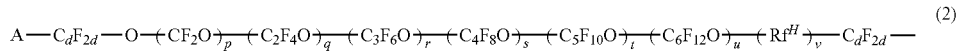 (2)

wherein A is a fluorine atom, a hydrogen atom or a monovalent fluorine-containing group terminating in a $-CF_3$ group, a $-CF_2H$ group or a $-CH_2F$ group; Rf is a fluorooxyalkylene group containing at least one hydrogen atom; d is independently for each unit an integer from 1 to 3; p, q, r, s, t, u and v are each integers from 0 to 200 and the sum p+q+r+s+t+u+v is from 3 to 200; the respective units may be linear or branched; and the respective repeating units shown within parentheses to which p, q, r, s, t, u and v are attached may be randomly bonded.

[3]
The fluoropolyether group-containing polymer of [1], wherein α in the formula (1) is 2 and Rf is a group of the general formula (3) below:

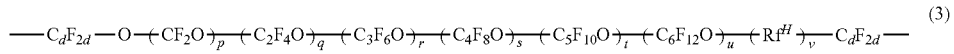 (3)

wherein $Rf^H$ is a fluorooxyalkylene group having at least one hydrogen atom; d is independently for each unit an integer from 1 to 3; p, q, r, s, t, u and v are each integers from 0 to 200 and the sum p+q+r+s+t+u+v is from 3 to 200; the respective units may be linear or branched; and the respective repeating units shown within parentheses to which p, q, r, s, t, u and v are attached may be randomly bonded.

[4]
The fluoropolyether group-containing polymer of any of [1] to [3], wherein X in the formula (1) is an alkylene group of 2 to 12 carbon atoms or an arylene group-containing alkylene group of 8 to 16 carbon atoms.

[5]
The fluoropolyether group-containing polymer of any of [1] to [4] which has a number-average molecular weight of from 1,000 to 50,000 in terms of polystyrene.

[6]
A method for preparing the fluoropolyether group-containing polymer of any of [1] to [5], comprising a step of reacting a fluoropolyether group-containing polymer of the general formula (4) below:

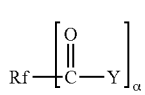 (4)

wherein Rf is a monovalent or divalent fluoropolyether group-containing polymer residue, Y is a removable monovalent group, and α is 1 or 2,
with an organometallic reagent having a β-hydrogen.

[7]
The method for preparing the fluoropolyether group-containing polymer of [6], wherein the organometallic reagent having a β-hydrogen is a Grignard reagent.

[8]
The method for preparing the fluoropolyether group-containing polymer of [7], wherein the Grignard reagent is a compound selected from those of the following formulas.

[Chem. 7]

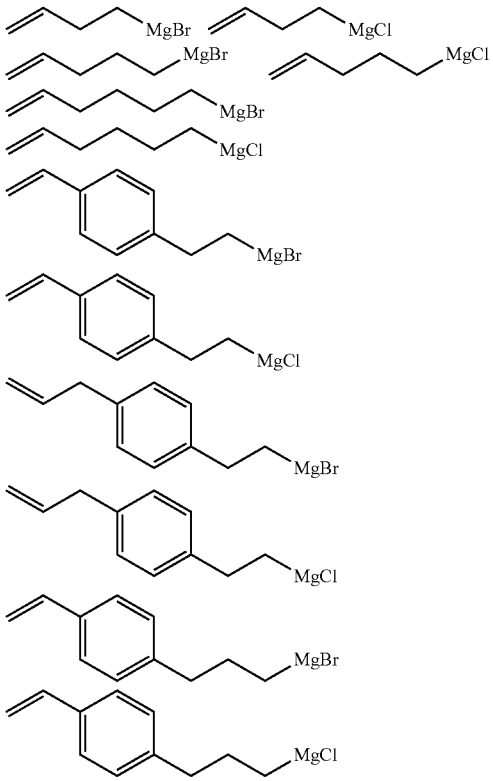

Advantageous Effects of Invention

The fluoropolyether group-containing polymer of the invention, by having on the molecule two types of moieties of differing reactivity, these being a terminal olefin moiety ($-CH=CH_2$) which is easily converted to various functional groups and a secondary hydroxyl group (a hydroxyl group bonded to a secondary carbon atom) of high reactivity, is capable of various end group modification. Moreover, by having the group linking the terminal olefin moiety with the secondary carbon atom bonded to the secondary hydroxyl group be an alkylene group which may include an arylene group (especially a phenylene group), a fluoropolyether group-containing polymer endowed with various improved durabilities such as chemical resistance and weather resistance can be obtained.

DESCRIPTION OF EMBODIMENTS

The fluoropolyether group-containing polymer of the invention is a fluoropolyether group-containing polymer of the general formula (1) below:

[Chem. 8]

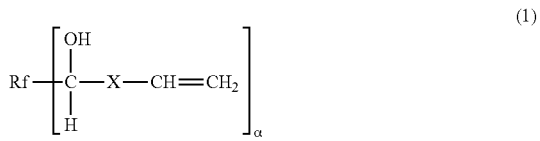

wherein Rf is a monovalent or divalent fluoropolyether group-containing polymer residue, each X is independently a divalent organic group, and α is 1 or 2, which preferably has a number-average molecular weight of from 1,000 to 50,000 in terms of polystyrene.

The fluoropolyether group-containing polymer of the invention, by linking both a terminal olefin moiety ($-CH=CH_2$) that is easily converted to a functional group and a secondary hydroxyl group (a hydroxyl group bonded to a secondary carbon atom) of high reactivity to a monovalent fluoropolyether group or a divalent fluoropolyether group-containing polymer residue (i.e., a monovalent or divalent fluoropolyether group-containing polymer residue), the polymer is characterized by being modifiable to various end groups.

In the formula (1) above, Rf is a monovalent or divalent fluoropolyether group-containing polymer residue. When α is 1 (that is, when Rf is a monovalent fluorooxyalkylene group-containing polymer residue), it is preferably a monovalent fluoropolyether group of the general formula (2) below. When α is 2 (that is, when Rf is a divalent fluorooxyalkylene group-containing polymer residue), it is preferably a divalent fluoropolyether group of the general formula (3) below.

[Chem. 9]

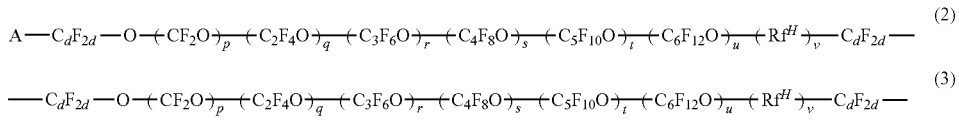

In these formulas, A is a fluorine atom, a hydrogen atom or a monovalent fluorine-containing group terminating in a $-CF_3$ group, a $-CF_2H$ group or a $-CH_2F$ group; $Rf^H$ is a fluorooxyalkylene group having at least one hydrogen atom; d is independently for each unit an integer from 1 to 3; p, q, r, s, t, u and v are each integers from 0 to 200 and the sum p+q+r+s+t+u+v is from 3 to 200; the respective units may be linear or branched; and the respective repeating units shown within parentheses to which p, q, r, s, t, u and v are attached may be randomly bonded.

In the formula (2), A is a fluorine atom, a hydrogen atom or a monovalent fluorine-containing group terminating in a —$CF_3$ group, a —$CF_2H$ group or a —$CH_2F$ group; and is preferably a fluorine atom, a —$CF_3$ group, a —$CF_2CF_3$ group or a —$CF_2CF_2CF_3$ group.

In the formulas (2) and (3), $Rf^H$ is a fluorooxyalkylene group that includes one or more hydrogen atom. Examples include, in one or combinations of two or more perfluorooxyalkylene recurring units such as $CF_2O$ units, $C_2F_4O$ units, $C_3F_6O$ units, $C_4F_8O$ units, $C_5F_{10}O$ units and $C_6F_{12}O$ units, those in which one or two of the fluorine atoms in each recurring unit are substituted with hydrogen atoms.

In the formulas (2) and (3), d is independently for each unit an integer from 1 to 3, and is preferably 1.

Also, p, q, r, s, t, u and v are each independently an integer from 0 to 200, p preferably being an integer from 5 to 100, q preferably being an integer from 5 to 100, r preferably being an integer from 0 to 100, s preferably being an integer from 0 to 100, t preferably being an integer from 0 to 100, u preferably being an integer from 0 to 100 and v preferably being an integer from 0 to 100. The sum p+q+r+s+t+u+v is an integer from 3 to 200, and preferably from 10 to 105, with p+q being more preferably an integer from 10 to 105, especially from 15 to 65, and r=s=t=u=v=0. When the sum p+q+r+s+t+u+v is smaller than the above upper limit, the adhesion and curability are good; when it is larger than the above lower limit, the characteristics of the fluoropolyether group can be fully exhibited, which is desirable.

In the formulas (2) and (3), the respective units may be linear or may be branched. Also, the respective repeating units indicated within parentheses to which p, q, r, s, t, u and v are attached may be randomly bonded.

Specific examples of the monovalent fluoropolyether group of the formula (2) include the following.

[Chem. 10]

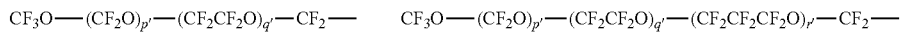

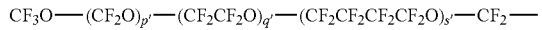
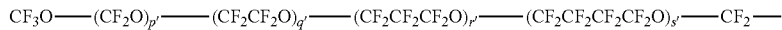

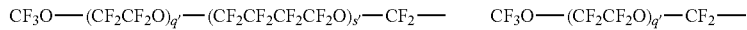
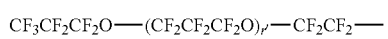 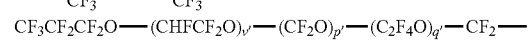
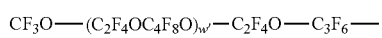

In these formulas, p', q', r' and s' are each integers from 1 to 200, v' is an integer from 1 to 100, w' is an integer from 1 to 99, and the sum of p', q', r', s' and v' is from 3 to 200. The respective repeating units shown within parentheses to which p', q', r' and s' are attached may be randomly bonded. Also, ($C_2F_4OC_4F_8O$) indicates a structure in which ($C_2F_4O$) units and ($C_4F_8O$) units are alternately repeated.

Specific examples of the divalent fluoropolyether group of the formula (3) include the following.

[Chem. 11]

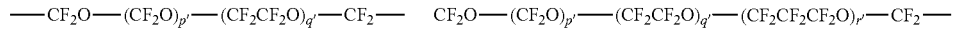

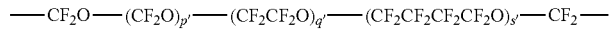

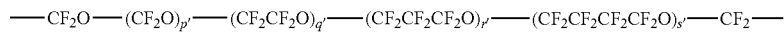

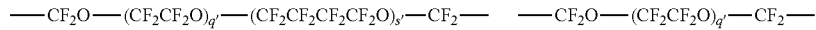

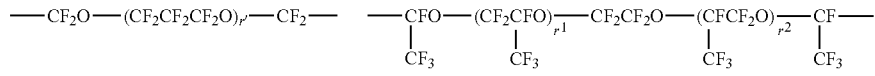

In these formulas, p', q', r' and s' are each independently an integer from 1 to 200, and the sum of p', q', r' and s' is from 3 to 200. Also, $r^1$ and $r^2$ are integers from 1 to 198, and the sum $r^1+r^2$ is from 2 to 199. The respective repeating units shown within parentheses to which p', q', r' and s' are attached may be randomly bonded.

In the formula (1), X is a group linking a terminal olefin moiety (—CH=CH$_2$) with a divalent carbon atom bonded to a divalent hydroxyl group, each X being independently a divalent organic group, preferably a divalent hydrocarbon group of 2 to 20 carbon atoms, more preferably an alkylene group of 2 to 12, especially 2 to 6, carbon atoms or an arylene group (preferably a phenylene group, especially a p-phenylene group)—containing alkylene group of 8 to 16 carbon atoms (i.e., an alkylene-arylene group of 8 to 16 carbon atoms), and even more preferably an ethylene group or propylene group (trimethylene group).

Specific examples of X include the following groups.

[Chem. 12]

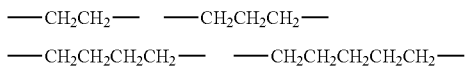

[Chem. 13]

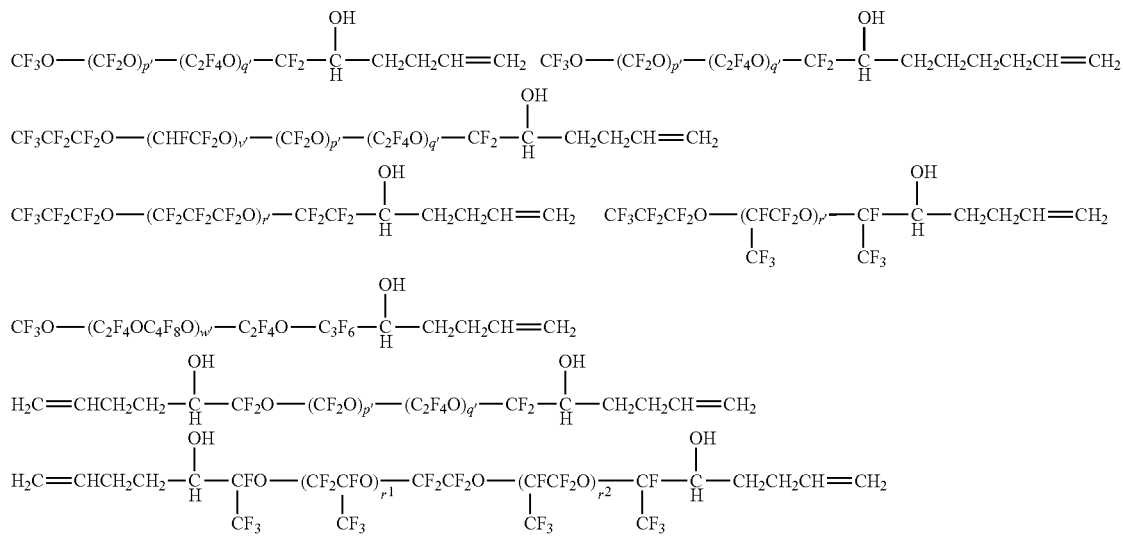

-continued

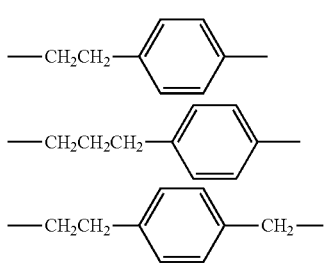

The fluoropolyether group-containing polymer of the formula (1) has a number-average molecular weight of preferably from 1,000 to 50,000, more preferably from 1,500 to 10,000, and even more preferably from 2,500 to 8,000. At a number-average molecular weight below 1,000, it may not be possible to fully manifest the water and oil repellency and the anti-smudging properties, etc. that are characteristics of the perfluoroalkylene ether structures. At a number-average molecular weight greater than 50,000, the concentration of terminal functional groups becomes too small and so the reactivity with and adhesion to the substrate may decrease. As used herein, "number-average molecular weight" refers to the number-average molecular weight obtained by gel permeation chromatography (GPC) under the following measurement conditions using polystyrene as the standard.

[Measurement Conditions]

Developing solvent: Hydrochlorofluorocarbon (HCFC)-225

Flow rate: 1 mL/min

Detector: Evaporative light-scattering detector

Columns: two 7.8 mm×30 cm TSKgel Multipore HXL-M columns, from Tosoh Corporation Column temperature: 35° C.

Amount of sample injected: 20 μL (concentration, 0.3 wt % in HCFC-225 solvent)

Specific examples of the fluoropolyether group-containing polymer of the formula (1) include the following.

In these formulas, p', q', r', v', w', $r^1$ and $r^2$ are as defined above, the sum of p', q' and v' is from 3 to 200, the sum $r^1+r^2$ is from 2 to 199, and the respective repeating units shown within parentheses to which p' and q' are attached may be randomly bonded. Also, (C$_2$F$_4$OC$_4$F$_8$O) indicates a structure in which (C$_2$F$_4$O) units and (C$_4$F$_8$O) units are alternately repeated.

The method for preparing the fluoropolyether group-containing polymer of the formula (1) is preferably a method that involves reacting a carbonyl group-terminated, fluoropolyether group-containing polymer of the general formula (4) below:

[Chem. 14]

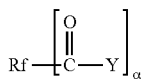
(4)

wherein Rf and a are as defined above, and Y is a removable monovalent group, with an organometallic reagent having a β-hydrogen.

In the formula (4), Y is a removable monovalent group, examples of which include hydrogen and halogen atoms and hydroxyl, alkoxy, amino, alkylamino, thiol, alkylthio and acyl groups.

Specific examples of Y include the following groups.

[Chem. 15]

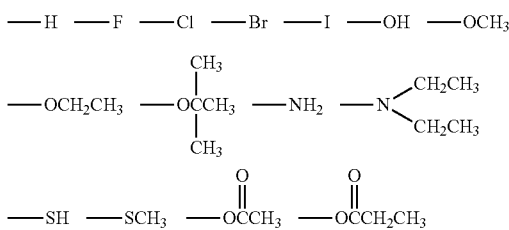

Specific examples of fluoropolyether group-containing polymers of the formula (4) include the following.

[Chem. 16]

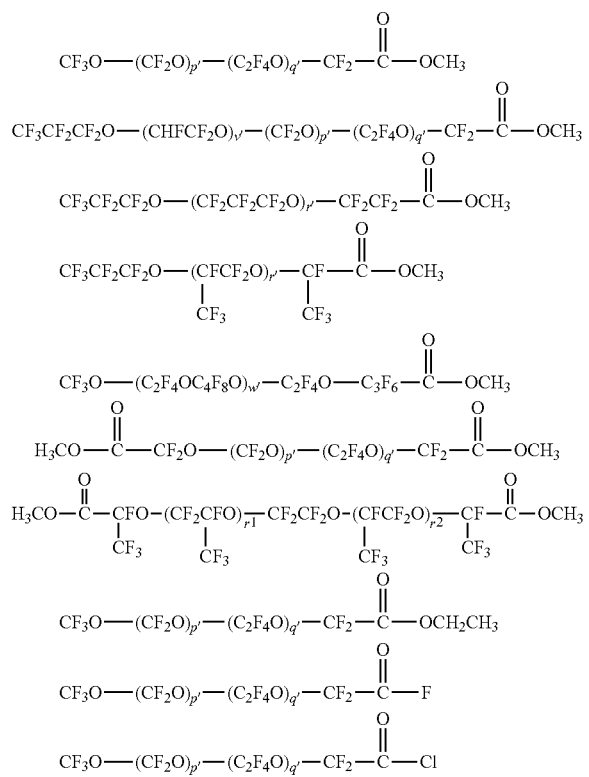

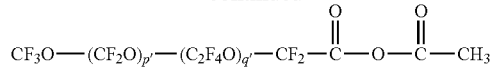

In these formulas, p', q', r', v', w', $r^1$ and $r^2$ are as defined above, the sum of p', q' and v' is from 3 to 200, the sum $r^1+r^2$ is from 2 to 100, and the respective repeating units shown within parentheses to which p' and q' are attached may be randomly bonded. Also, $(C_2F_4OC_4F_8O)$ indicates a structure in which $(C_2F_4O)$ units and $(C_4F_8O)$ units are alternately repeated.

The organometallic reagent having a β-hydrogen is, more specifically, an organometallic reagent having an aliphatic unsaturated double bond (olefin moiety) at the end and having also a β-hydrogen (i.e., a hydrogen atom bonded to a carbon atom at the β position to the metal atom). Examples include organolithium reagents, Grignard reagents, organozinc reagents, organoboron reagents and organotin reagents. Particularly from the standpoint of handleability, the use of a Grignard reagent or an organozinc reagent is preferred, with the use of a Grignard reagent having an aliphatic unsaturated double bond at the end and also having a β-hydrogen being more preferred.

Examples of compounds that can be used as the organometallic reagent having a β-hydrogen include the following.

[Chem. 17]

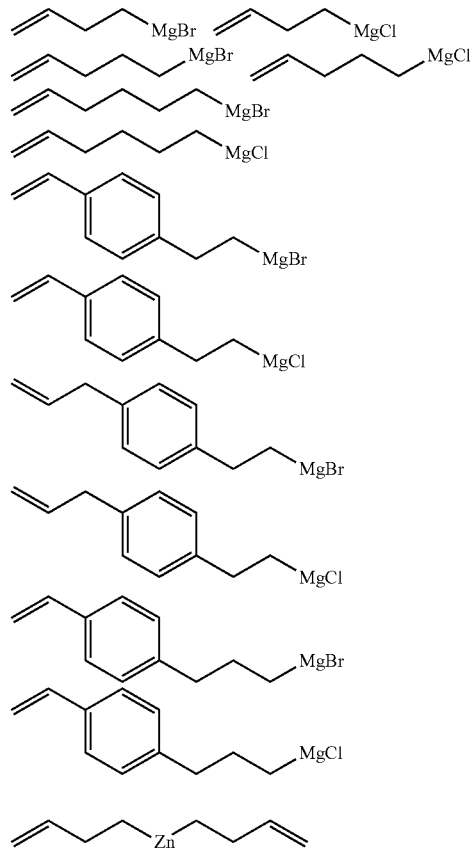

The organometallic reagent having a β-hydrogen is used in an amount, per equivalent of reactive end groups (removable monovalent groups) on the fluoropolyether group-containing polymer of the formula (4), of preferably from 2 to 5 equivalents, more preferably from 2.5 to 3.5 equivalents, and even more preferably about 3 equivalents.

Reagents other than the above reagent may be added in the method for preparing the fluoropolyether group-containing polymer of the formula (1), within ranges that do not detract from the advantageous effects of the invention.

A solvent may be used in the method for preparing the fluoropolyether group-containing polymer of the formula (1). The solvent used at this time is not particularly limited, although the use of a fluorinated solvent is preferred given that the reaction compound is a fluorine compound. Examples of fluorinated solvents include 1,3-bistrifluoromethylbenzene, trifluoromethylbenzene, perfluorinated solvents commercially available from AGC Inc. (Asahiklin AC2000, Asahiklin AC6000), HFE solvents commercially available from the 3M Company (e.g., NOVEC 7100: $C_4F_9OCH_3$; NOVEC 7200: $C_4F_9OC_2H_5$; NOVEC 7300: $C_2F_5$—$CF(OCH_3)$—$CF(CF_3)_2$), and perfluorinated solvents similarly available from the 3M Company (e.g., PF 5080, PF 5070, PF 5060). The fluorinated solvents may be used singly or in admixture.

Alternatively, organic solvents other than the above fluorinated solvents may be used as the solvent. Examples of organic solvents that may be used include ether-type solvents such as tetrahydrofuran (THF), monoethylene glycol dimethyl ether, diethylene glycol dimethyl ether, triethylene glycol dimethyl ether, tetraethylene glycol dimethyl ether and dioxane. The organic solvent may be used singly or may be used in admixture with a fluorinated solvent.

The amount of solvent that may be used per 100 parts by weight of the fluoropolyether group-containing polymer of the formula (4) is from 10 to 600 parts by weight, preferably from 50 to 400 parts by weight, and more preferably from 200 to 350 parts by weight.

The method for preparing the fluoropolyether group-containing polymer of the formula (1) may involve mixing together, for example, a fluoropolyether group-containing polymer of the general formula (4) below:

[Chem. 18]

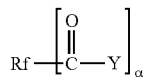

(4)

wherein Rf, α and Y are as defined above,
a Grignard reagent as a nucleophilic agent (organometallic reagent having a β-hydrogen) and, as the solvents, Asahiklin AC6000 (AGC Inc.) and THF, and aging at 0 to 80° C., preferably 45 to 70° C., and more preferably about 50° C., for 1 to 12 hours, and preferably 5 to 7 hours.

Next, the reaction is stopped and the aqueous layer and fluorinated solvent layer are separated by a separatory operation. The resulting fluorinated solvent layer is additionally washed with an organic solvent and the solvent is distilled off, thereby giving a fluoropolyether group-containing polymer of the formula (1) above.

The inventive fluoropolyether group-containing polymer of the formula (1) has two types of structures of differing reactivity, these being an olefin moiety that is easily converted to a functional group and a secondary hydroxyl group of high reactivity, making it possible to introduce various functional groups by selecting the reaction conditions.

Examples of the functional groups that can be introduced include hydrolyzable silyl groups (e.g., alkoxysilyl groups), alkyl groups, phenyl groups, vinyl groups, allyl groups, acyl groups, carboxyl groups, ester groups, amide groups, hydroxyl groups, amino groups, thiol groups, polyether groups, silyl groups, siloxane groups, thioester groups, phosphate ester groups and phosphate groups.

The fluoropolyether group-containing polymer of the invention may be used as, for example, a surface treatment agent, and may be advantageously used in surface treatment applications on substrates and articles, including optical articles such as car navigation systems, mobile phones, smart phones, digital cameras, digital video cameras, PDA's, portable audio players, car audio systems, game consoles, eyeglass lenses, camera lenses, lens filters, sunglasses, gastroscopes and other medical devices, photocopiers, personal computers, liquid-crystal displays, organic EL displays, plasma displays, touch panel displays, protective films and anti-reflective coatings.

EXAMPLES

The invention is described more fully below by way of Examples, although these Examples do not limit the invention. In the Examples below, the number-average molecular weight is a polystyrene-equivalent value obtained by gel permeation chromatography (GPC).

Example 1

3-Butenylmagnesium bromide, 150 mL (0.5 M solution in THF: $7.5 \times 10^{-2}$ mol), was placed in a reactor and stirred. Next, a mixture of 100 g ($2.5 \times 10^{-2}$ mol) of the compound of the formula (A) below:

[Chem. 19]

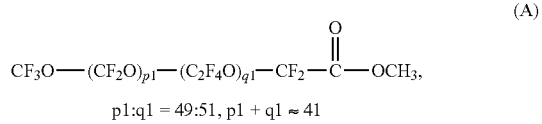

$p1:q1 = 49:51, p1 + q1 \approx 41$ 200 g of Asahiklin AC6000 and 100 g of PF 5060 was added dropwise to the reactor, following which the mixture was heated 6 hours at 50° C. After the completion of heating, the system was cooled to room temperature and an aqueous hydrochloric acid solution was added dropwise. The fluorocarbon compound layer on the bottom was recovered by a separatory operation and washed with acetone. The fluorocarbon compound layer on the bottom after washing was again recovered and the remaining solvent was driven off by distillation under reduced pressure, giving 95 g of the fluoropolyether group-containing polymer of the formula (B) below:

[Chem. 20]

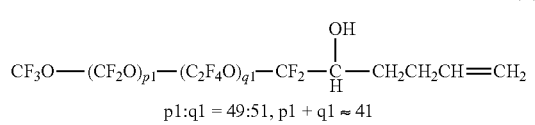

$p1:q1 = 49:51, p1 + q1 \approx 41$ wherein, number-average molecular weight, approx. 3,900.

¹H-NMR
δ 1.4-1.7 (C—C$\underline{H_2}$CH$_2$CH=CH$_2$) 2H
δ 1.9-2.2 (C—C$\underline{H_2}$CH$_2$CH=CH$_2$, —CF$_2$—CH(OH)—CH$_2$—) 3H
δ 3.6-3.8 (—CF$_2$—C$\underline{H}$(OH)—CH$_2$—) 1H
δ 4.8-4.9 (—CH$_2$CH=C$\underline{H_2}$) 2H
δ 5.5-5.6 (—CH$_2$C$\underline{H}$=CH$_2$) 1H Example 2

3-Butenylmagnesium bromide, 10.2 mL (0.5 M solution in THF: $5.1 \times 10^{-3}$ mol), was placed in a reactor and stirred. Next, a mixture of 10 g ($1.7 \times 10^{-3}$ mol) of the compound of the formula (C) below:

[Chem. 21]

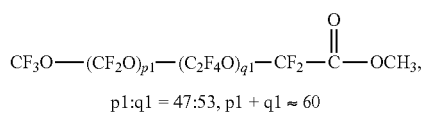

$p1:q1 = 47:53, p1 + q1 \approx 60$ 20 g of Asahiklin AC6000 and 10 g of PF 5060 was added dropwise to the reactor, following which the mixture was heated 6 hours at 50° C. After the completion of heating, the system was cooled to room temperature and an aqueous hydrochloric acid solution was added dropwise. The fluorocarbon compound layer on the bottom was recovered by a separatory operation and washed with acetone. The fluorocarbon compound layer on the bottom after washing was again recovered and the remaining solvent was driven off by distillation under reduced pressure, giving 9 g of the fluoropolyether group-containing polymer of the formula (D) below:

[Chem. 22]

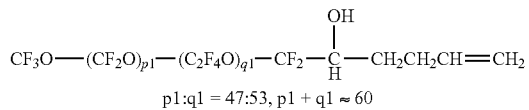

$p1:q1 = 47:53, p1 + q1 \approx 60$ wherein, number-average molecular weight, approx. 5,700.
¹H-NMR
δ 1.4-1.7 (C—C$\underline{H_2}$CH$_2$CH=CH$_2$) 2H
δ 1.9-2.2 (C—C$\underline{H_2}$CH$_2$CH=CH$_2$, —CF$_2$—CH(O$\underline{H}$)—CH$_2$—) 3H
δ 3.6-3.8 (—CF$_2$—C$\underline{H}$(OH)—CH$_2$—) 1H
δ 4.8-4.9 (—CH$_2$CH=C$\underline{H_2}$) 2H
δ 5.5-5.6 (—CH$_2$C$\underline{H}$=CH$_2$) 1H Example 3

3-Butenylmagnesium bromide, 28.8 mL (0.5 M solution in THF: $1.4 \times 10^{-2}$ mol), was placed in a reactor and stirred. Next, a mixture of 10 g ($2.4 \times 10^{-3}$ mol) of the compound of the formula (E) below:

[Chem. 23]

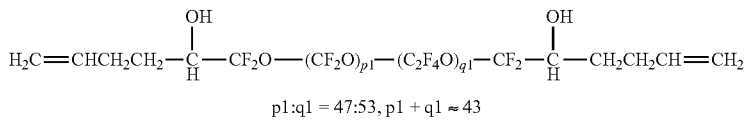

$p1:q1 = 47:53, p1 + q1 \approx 43$ 20 g of Asahiklin AC6000 and 10 g of PF 5060 was added dropwise to the reactor, following which the mixture was heated 6 hours at 50° C. After the completion of heating, the system was cooled to room temperature and an aqueous hydrochloric acid solution was added dropwise. The fluorocarbon compound layer on the bottom was recovered by a separatory operation and washed with acetone. The fluorocarbon compound layer on the bottom after washing was again recovered and the remaining solvent was driven off by distillation under reduced pressure, giving 9.4 g of the fluoropolyether group-containing polymer of the formula (F) below:

[Chem. 24]

$$H_2C=CHCH_2CH_2-\underset{H}{\overset{OH}{\underset{|}{C}}}-CF_2O-(CF_2O)_{p1}-(C_2F_4O)_{q1}-CF_2-\underset{H}{\overset{OH}{\underset{|}{C}}}-CH_2CH_2CH=CH_2 \quad (F)$$

$p1:q1 = 47:53, p1 + q1 \approx 43$ wherein, number-average molecular weight, approx. 4,200.
¹H-NMR
δ 1.4-1.7 (C—C$\underline{H_2}$CH$_2$CH=CH$_2$) 4H
δ 1.9-2.2 (C—C$\underline{H_2}$CH$_2$CH=CH$_2$, —CF$_2$—CH(O$\underline{H}$)—CH$_2$—) 6H
δ 3.6-3.8 (—CF$_2$—C$\underline{H}$(OH)—CH$_2$—) 2H
δ 4.8-4.9 (—CH$_2$CH=C$\underline{H_2}$) 4H
δ 5.5-5.6 (—CH$_2$C$\underline{H}$=CH$_2$) 2H Example 4

3-Butenylmagnesium bromide, 14.4 mL (0.5 M solution in THF: $7.2 \times 10^{-3}$ mol), was placed in a reactor and stirred. Next, a mixture of 10 g ($2.4 \times 10^{-3}$ mol) of the compound of the formula (G) below:

[Chem. 25]

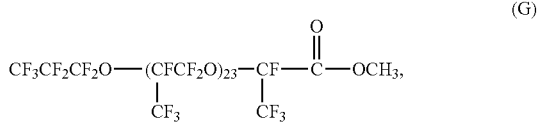

20 g of Asahiklin AC6000 and 10 g of PF 5060 was added dropwise to the reactor, following which the mixture was heated 6 hours at 50° C. After the completion of heating, the system was cooled to room temperature and an aqueous hydrochloric acid solution was added dropwise. The fluorocarbon compound layer on the bottom was recovered by a separatory operation and washed with acetone. The fluorocarbon compound layer on the bottom after washing was again recovered and the remaining solvent was driven off by distillation under reduced pressure, giving 8.9 g of the fluoropolyether group-containing polymer of the formula (H) below:

[Chem. 26]

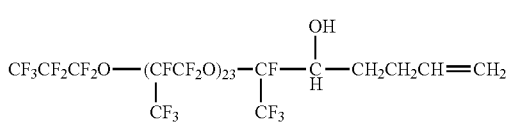

(H)

wherein, number-average molecular weight, approx. 4,100.
$^1$H-NMR

δ 1.4-1.7 (C—C$\underline{H}_2$CH$_2$CH═CH$_2$) 2H
δ 1.9-2.2 (C—$\overline{CH}_2$C$\underline{H}_2$CH═CH$_2$, —CF$_2$—CH(O$\underline{H}$)—CH$_2$—) 3H
δ 3.6-3.8 (—CF$_2$—C$\underline{H}$(OH)—CH$_2$—) 1H
δ 4.8-4.9 (—CH$_2$CH═C$\underline{H}_2$) 2H
δ 5.5-5.6 (—CH$_2$C$\underline{H}$═CH$_2$) 1H Example 5

5-Hexenylmagnesium bromide, 14.4 mL (0.5 M solution in THF: 7.2×10$^{-3}$ mol), was placed in a reactor and stirred. Next, a mixture of 10 g (2.4×10$^{-3}$ mol) of the compound of the formula (I) below:

[Chem. 27]

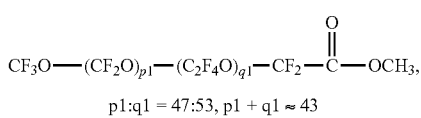

(I)

20 g of Asahiklin AC6000 and 10 g of PF 5060 was added dropwise to the reactor, following which the mixture was heated 6 hours at 50° C. After the completion of heating, the system was cooled to room temperature and an aqueous hydrochloric acid solution was added dropwise. The fluorocarbon compound layer on the bottom was recovered by a separatory operation and washed with acetone. The fluorocarbon compound layer on the bottom after washing was again recovered and the remaining solvent was driven off by distillation under reduced pressure, giving 8.2 g of the fluoropolyether group-containing polymer of the formula (J) below:

[Chem. 28]

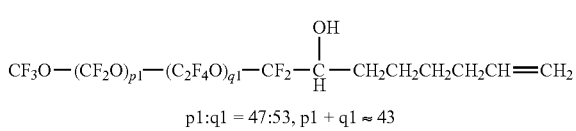

(J)

wherein, number-average molecular weight, approx. 4,200.
$^1$H-NMR

δ 1.3-1.8 (C—C$\underline{H}_2$C$\underline{H}_2$C$\underline{H}_2$CH$_2$CH═CH$_2$) 6H
δ 1.9-2.1 (C—CH$_2$CH$_2$CH$_2$C$\underline{H}_2$CH═CH$_2$) 2H
δ 3.3-3.5 (—CF$_2$—CH(O$\underline{H}$)—CH$_2$—) 1H
δ 3.6-3.8 (—CF$_2$—C$\underline{H}$(OH)—CH$_2$—) 1H
δ 4.7-4.9 (—CH$_2$CH═C$\underline{H}_2$) 2H
δ 5.5-5.7 (—CH$_2$C$\underline{H}$═CH$_2$) 1H It was thus possible to introduce onto a fluoropolyether group-containing polymer both a terminal olefin moiety that is easily converted to a functional group and a secondary hydroxyl group of high reactivity. This polymer had two types of structures of differing reactivity, enabling various functional groups to be introduced by selecting the reaction conditions.

This invention is not limited to the embodiments described above, which are presented here for the purpose of illustration. Any embodiments having substantially the same constitution as the technical ideas set forth in the claims and exhibiting similar working effects fall within the technical scope of the invention.

The invention claimed is:

1. A fluoropolyether group-containing polymer of the general formula (1) below:

[Chem. 1]

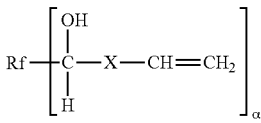

(1)

wherein Rf is a monovalent or divalent fluoropolyether group-containing polymer residue, each X is independently a divalent organic group, and α is 1 or 2.

2. The fluoropolyether group-containing polymer of claim 1, wherein a in the formula (1) is 1 and Rf is a group of the general formula (2) below:

[Chem. 2]

(2)

wherein A is a fluorine atom, a hydrogen atom or a monovalent fluorine-containing group terminating in a —CF$_3$ group, a —CF$_2$H group or a —CH$_2$F group; Rf$^H$ is a fluorooxyalkylene group containing at least one hydrogen atom; d is independently for each unit an integer from 1 to 3; p, q, r, s, t, u and v are each integers from 0 to 200 and the sum p+q+r+s+t+u+v is from 3 to 200; the respective units may be linear or branched; and the respective repeating units shown within parentheses to which p, q, r, s, t, u and v are attached may be randomly bonded.

3. The fluoropolyether group-containing polymer of claim 1, wherein a in the formula (1) is 2 and Rf is a group of the general formula (3) below:

[Chem. 3]

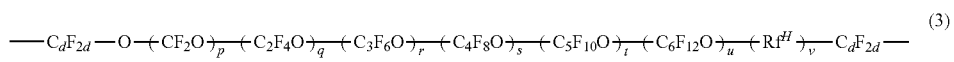

(3)

wherein $Rf^H$ is a fluorooxyalkylene group having at least one hydrogen atom; d is independently for each unit an integer from 1 to 3; p, q, r, s, t, u and v are each integers from 0 to 200 and the sum p+q+r+s+t+u+v is from 3 to 200; the respective units may be linear or branched; and the respective repeating units shown within parentheses to which p, q, r, s, t, u and v are attached may be randomly bonded.

4. The fluoropolyether group-containing polymer of claim 1, wherein X in the formula (1) is an alkylene group of 2 to 12 carbon atoms or an arylene group-containing alkylene group of 8 to 16 carbon atoms.

5. The fluoropolyether group-containing polymer of claim 1 which has a number-average molecular weight of from 1,000 to 50,000 in terms of polystyrene.

6. A method for preparing the fluoropolyether group-containing polymer of claim 1, comprising a step of reacting a fluoropolyether group-containing polymer of the general formula (4) below:

[Chem. 4]

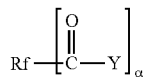

(4)

wherein Rf is a monovalent or divalent fluoropolyether group-containing polymer residue, Y is a removable monovalent group, and α is 1 or 2, with an organometallic reagent having a β-hydrogen.

7. The method for preparing the fluoropolyether group-containing polymer of claim 6, wherein the organometallic reagent having a β-hydrogen is a Grignard reagent.

8. The method for preparing the fluoropolyether group-containing polymer of claim 7, wherein the Grignard reagent is a compound selected from those of the following formulas:

[Chem. 5]

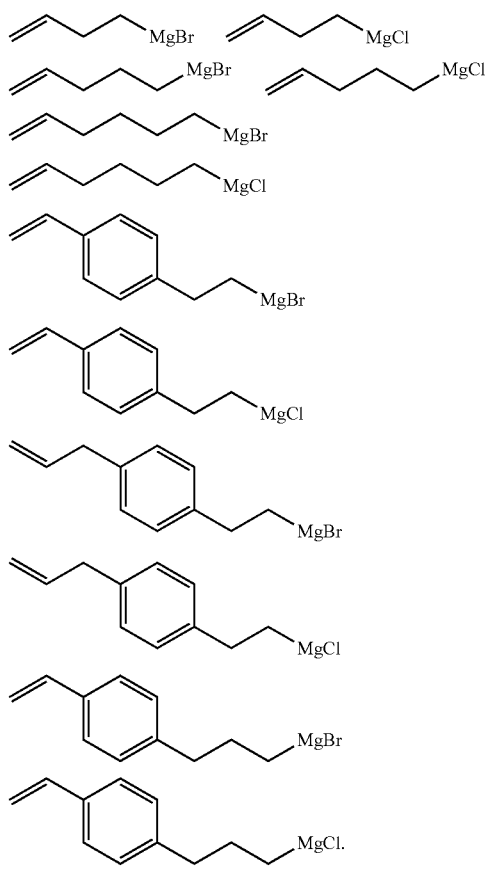

* * * * *